(12) United States Patent
Link, II (10) Patent No.: US 9,386,400 B2
(45) Date of Patent: Jul. 5, 2016

(54) AUTOMATIC IMPLEMENTATION OF PREFERENCES BASED ON DETECTION OF A MOBILE DEVICE

(71) Applicant: Verizon Patent and Licensing Inc., Arlington, VA (US)

(72) Inventor: Charles M. Link, II, Atlanta, GA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/531,668

(22) Filed: Nov. 3, 2014

(65) Prior Publication Data

US 2016/0127856 A1 May 5, 2016

(51) Int. Cl.
*H04W 4/00* (2009.01)
*H04W 4/02* (2009.01)
*H04W 64/00* (2009.01)
*H04W 8/00* (2009.01)
*H04W 76/02* (2009.01)

(52) U.S. Cl.
CPC .............. *H04W 4/008* (2013.01); *H04W 4/02* (2013.01); *H04W 8/005* (2013.01); *H04W 64/003* (2013.01); *H04W 76/023* (2013.01)

(58) Field of Classification Search
None
See application file for complete search history.

(56) References Cited

U.S. PATENT DOCUMENTS

2009/0131080 A1* 5/2009 Nadler ................... G06Q 30/02
455/456.3
2013/0281084 A1* 10/2013 Batada .................. H04W 88/06
455/426.1

* cited by examiner

*Primary Examiner* — Alejandro Rivero (57) ABSTRACT

A detector, positioned at a first geographic location, receives a message from a mobile device that is sent without a request from the detector and via a short-range communications protocol, such as Bluetooth® or other WPAN. The detector parses the message to obtain data associated with the mobile device, such as extracting a media access control (MAC) address, a device type, or other information from the message. The detector may further identify an attribute, such as a signal power loss or frequency, associated with the received message. A second geographic location, associated with the mobile device, may be determined based on the attribute. The detector may also identify an associated user based on the data associated with the mobile device. The local device may receive data identifying, for example, the user, the second geographic location, or preference data related to user.

20 Claims, 8 Drawing Sheets

| MOBILE DEVICE IDENTIFIER 510 | USER IDENTIFIER 520 | CURRENT LOCATION 530 | PRIOR LOCATION 540 | OTHER DATA 550 |
|---|---|---|---|---|
| MAC ADDRESS 1 | USER NAME 1 | LOCATION 1 | PRIOR LOCATION 1 | OTHER DATA 1 |
| ... | ... | ... | ... | ... |
| MAC ADDRESS N | USER NAME N | LOCATION N | PRIOR LOCATION N | OTHER DATA N |

AUTOMATIC IMPLEMENTATION OF PREFERENCES BASED ON DETECTION OF A MOBILE DEVICE

BACKGROUND INFORMATION

Devices may wirelessly communicate over short distances (e.g., within a few meters) using a wireless personal area network (WPAN). Devices may communicate over a WPAN using, for example, radio signals (e.g., Bluetooth® or Wi-Fi®) and/or infrared signals (e.g., Infrared Data Association, or IrDA). In a WPAN, two devices may pair (e.g., establish a wireless connection) to exchange data when brought in proximity of one another.

DETAILED DESCRIPTION OF PREFERRED EMBODIMENTS

The following detailed description refers to the accompanying drawings. The same reference numbers in different drawings identify the same or similar elements.

Implementations described herein may relate to a detector positioned at a first geographic location. The detector receives a message from a mobile device that may be sent without a request from the detector and via a short-range communications protocol, such as Bluetooth® or another WPAN. For example, the message may be a Bluetooth® connection request. The detector parses the message to obtain data associated with the mobile device, and the detector identifies, using the data associated with the mobile device, a user associated with the mobile device. For example, the data associated with the mobile device may include a media access control (MAC) address of the mobile device, and the MAC address may be used to identify the user.

In one example, the first geographic location may be associated with a commercial establishment. The detector may identify preference data associated with the commercial establishment, such as information identifying a prior purchase at the commercial establishment, and may forward the preference data to the local device.

In one implementation, the detector may identify an attribute, such as a signal power loss and/or a frequency, associated with the received message. A second geographic location, associated with the mobile device, may be identified based on the attribute, and the second geographic location may be identified to the local device. For example, the signal power loss for the message may be identified based on the message type, a device type associated with the mobile device, etc., and a distance between the mobile device and the detector may be determined based on the signal power loss. The detector may include a directional antenna that detects and/or attenuates the message in a particular direction, and the distance may be determined with respect to the particular direction.

Figure 1A:
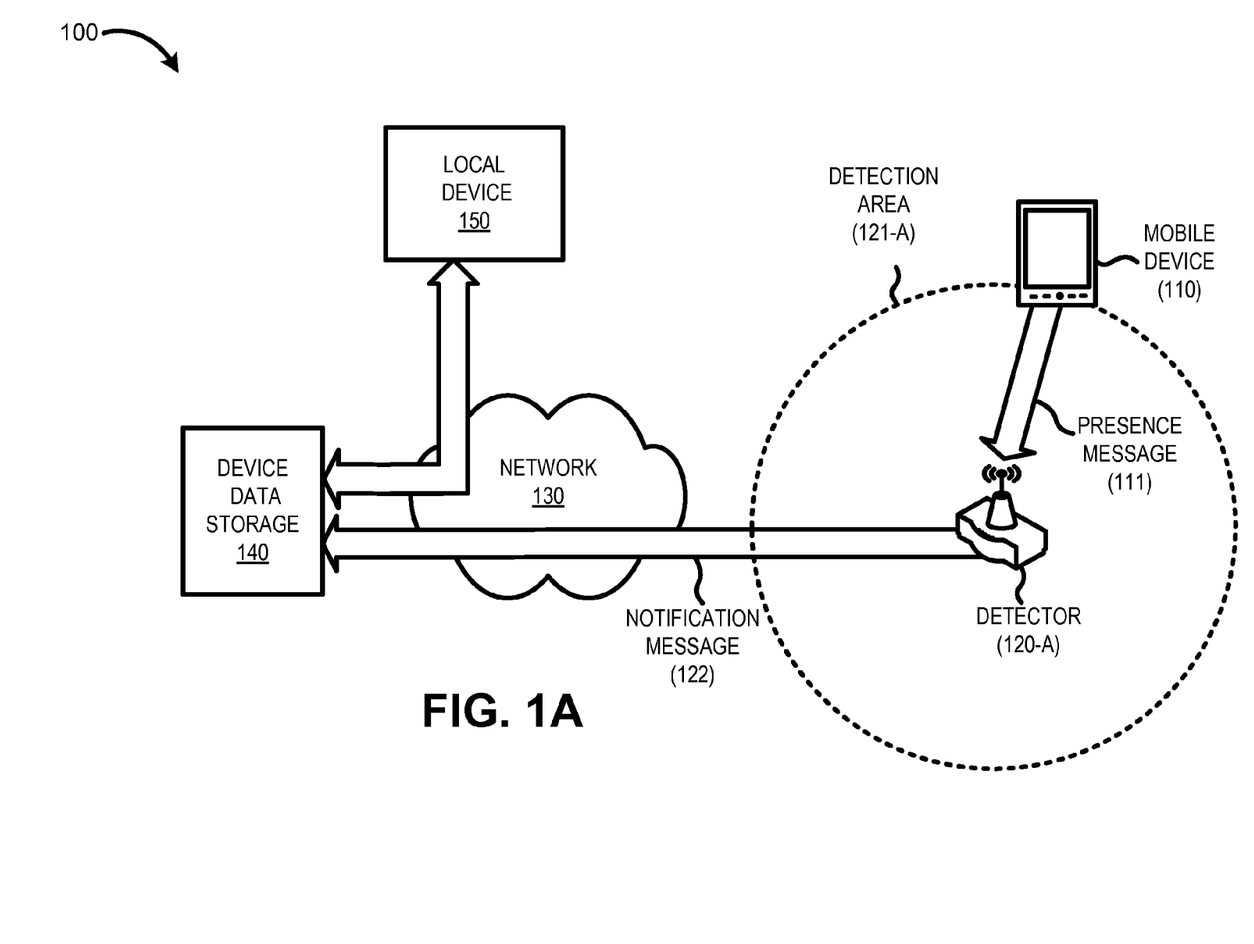
FIGS. 1A and 1B are diagrams illustrating an exemplary environment according to implementations described herein.

FIG. 1A is a diagram showing an exemplary environment 100 in which the systems and/or methods, described herein, may be implemented. As shown in FIG. 1A, environment 100 may include a mobile device 110, a detector 120-A (shown in FIG. 1A as detector 120-A and in FIG. 1B, discussed below, as detector 120-B; hereinafter, detector "120" appearing without the "A" or "B" suffix refers to either or both detectors 120-A and 120-B), a network 130, a device data storage 140, and a local device 150.

Figure 1B:
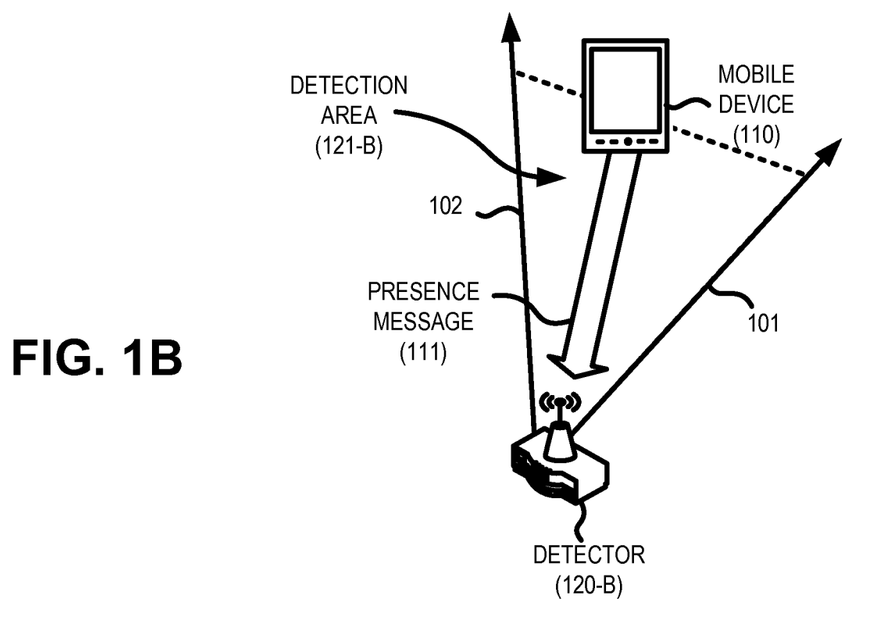

As shown in FIGS. 1A and 1B, mobile device 110 may send a presence message 111 via a short-range communications protocol, such as Bluetooth®, Wi-Fi®, or IrDA. Presence message 111 may include, for example, a "beacon frame" associated with a connection request. In one implementation, mobile device 110 may transmit presence message 111 passively (e.g., without a request from detector 120). For example, if mobile device 110 supports Bluetooth® communications, mobile device 110 may transmit, as presence message 111, a connection request when mobile device 110 is operating in a visible (or discoverable) mode. In another implementation, mobile device 110 may send presence message 111 in response to a message received from detector 120. For example, if detector 120 is included in or associated with a femtocell that transmits an offer for short-range data and/or communication services, presence message 111 may be associated with a response to the offer, such as a request to connect to the femtocell.

The presence message 111 may include, for example, a device identifier associated with mobile device 110, such as a serial number, a mobile station identifier (MSID), a mobile identification number (MIN), a telephone number, a network address, etc. For example, presence message 111 may include a media access control (MAC) address associated with mobile device 110. A MAC address is a unique identifier assigned to a network interface for communications on a physical network segment (e.g., a Bluetooth® wireless interface) between mobile device 110 and detector 120. The MAC address may be used as a network address (e.g., in the media access control protocol sublayer of the open systems interconnection (OSI) model) for mobile device 110 in various types of communication, including a WPAN or other IEEE 802 network technologies such as Ethernet. Mobile device 110 may be associated with multiple MAC addresses, such as separate MAC addresses for different types of communication protocols, such as a first MAC address (e.g., 48 bit address based on a MAC-48 protocol) for Bluetooth® communications and a second, different MAC address (e.g., an extended unique identifier, or EUI, 48 bit or 64 bit address) for data exchanges via a wireless wide area network (WWAN), such as long term evolution (LTE), 4G, 3G, or another wireless data protocol.

Presence message 111 may further include additional data. For example, when presence message 111 corresponds to a Bluetooth® connection request, presence message 111 may include, for example, data identifying a class of device (CoD) identifying a device class or type associated with mobile device 110, a list of services offered by mobile device 110, and/or other information identifying features associated with mobile device 110, an associated manufacturer, communications protocols that are accepted by mobile device 110, a clock offset used by mobile device 110, etc.

As used herein, mobile device 110 may include any device that is capable of transmitting presence message 111. For example, mobile device 110 may include a portable communication device (e.g., a mobile phone, a smart phone, a phablet device, a global positioning system (GPS) device, and/or another type of wireless device); a laptop, tablet, or another type of portable computer; a media playing device; a portable gaming system; and/or any other type of mobile computer device with communication and output capabilities.

Detector 120 may receive presence message 111 when mobile device 110 is located within a detection area 121 (shown in FIG. 1A as detection area 121-A and in FIG. 1B as detection area 121-B). Detection area 121 may correspond to a geographic region in which detector 120 is able to detect presence message 111 transmitted from mobile device 110. In the implementation shown in FIG. 1A, detector 120-A may include a non-directional antenna (or other receiving device) to detect presence message 111 when detector 120-A is within transmission range of mobile device 110. For example, if presence message 111 corresponds to a Bluetooth® connection request or other Bluetooth® communication, detector 120-A may typically detect presence message 111 if mobile device is located within 25 to 50 meters of detector 120-A. As shown in FIG. 1A, detection area 121-A may be substantially circular (or may be envisioned as substantially spherically-related, if a height dimension for mobile device 110 is also involved) to reflect that detector 120-A may receive presence message 111 in virtually any radial direction if mobile device 110 and detector 120-A are within the communications range (radial distance) associated with presence message 111.

In another implementation shown in FIG. 1B, detector 120-B may include a directional antenna (e.g., detector 120-B is associated with a non-circular detection area 121-B). For example, detector 120-B may include an antenna with a parabolic or other shaped reflector element that enables and/or improves the ability of detector 120-B to receive presence message 111 in a first direction but not in a second, opposite direction. In the example, shown in FIG. 1B, detection area 121-B may include a region between a first vector 101 and a second vector 102 that is within the communication range for presence message 111. For example, if detector 120-B is positioned near an entrance to a commercial location, such as a restaurant, detector 120-B may receive presence message 111 when mobile device 110 is near the entrance, but not after mobile device 110 has passed through the entrance and is within the commercial location.

With respect to either FIG. 1A or FIG. 1B, after receiving presence message 111, detector 120 may parse presence message 111 to extract data identifying mobile device 110. For example, detector 120 may parse presence message 111 to determine the MAC address or other device identifier, a device type, etc. associated with mobile device 110. In another implementation, detector 120 may use the data included in presence message 111 to establish communications with mobile device 110 or another device (not shown in FIG. 1A or 1B) to obtain information regarding mobile device 110. For example, detector 120 may use authentication data, session data, etc. in presence message 111 to communicate with mobile device 110 and to obtain the desired identifier, a location (e.g., a global positioning system value), etc. associated with mobile device 110.

Additionally or alternatively, detector 120 may detect and analyze a characteristic associated with presence message 111. For example, detector 120 may identify a change in an attribute of presence message 111 after transmission from mobile device 110. For example, detector 120 may identify a frequency change, a transmission delay, a received portion of presence message 111, etc. In another example, detector 120 may measure a received signal strength of a received presence message 111. For example, detector 120 may determine a received signal strength indicator (RSSI) value and/or a received channel power indicator (RCPI) value, as defined in IEEE standard 802.11 for wireless local area networks (WLANs).

As shown in FIG. 1A, detector 120-A may form a notification message 122 and may forward notification message 122 to device data storage 140 via network 130. Notification message 122 may include data identifying a location and/or other information associated with detector 120-A. Detector 120-A may also include, in notification message 122, information extracted from presence message 111. For example, if presence message 111 corresponds to a Bluetooth® connection request or other Bluetooth® communication, detector 120-A may include a MAC address, a CoD value identifying a device class or type associated with mobile device 110, a list of services offered by mobile device 110, and/or other information identifying features associated with mobile device 110, an associated manufacturer, communications protocols that are accepted by mobile device 110, a clock offset used by mobile device 110, etc. Detector 120-A may further include, in notification message 122, data regarding a detected attribute of a received version of presence message 111, such as a received signal strength, frequency, etc.

In one implementation, detector 120-A may correspond to an access point for accessing communications and/or data services. For example, detector 120-A may be configured to use IEEE 802.11 standards for implementing a wireless local area network (LAN) with mobile device 110. For example, detector 120-A may enable mobile device 110 to access the voice and/or data services, such as to communicate with another mobile device. In another implementation, detector 120-A may be included in or is associated with a base station that enables a wireless device, such as mobile device 110, to communicate with network 130. For example, detector 120-A may be included in an LTE eNodeB base station, a Global System for Mobile Communications (GSM) base station, a Code Division Multiple Access (CDMA) base station, and/or another type of base station. Mobile device 110 may forward presence message 111 in connection with requesting the voice and/or data services from the access point or the base station.

Detector 120-A may forward notification message 122 to device data storage 140 via network 130. Network 130 may include one or more circuit-switched networks and/or packet-switched networks. For example, network 130 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Device data storage 140 may process notification message 122 to obtain information regarding mobile device 110 and/or detector 120-A. For example, device data storage 140 may store information associating mobile device 110 (and its user) with a location of detector 120-A.

In one implementation, device data storage 140 may further process data within notification message 122 to determine a more precise location and/or additional information regarding mobile device 110. For example, device data storage 140 may determine a device type (e.g., based on a CoD value included in presence message 111), a manufacturer, model, operational mode, or other feature associated with mobile device 110, and device data storage 140 may use this information to determine an original signal power that mobile device 110 used to transmit presence message 111. Device data storage 140 may further compare the original signal power and a signal power of presence message 111, as received by detector 120-A, to determine an amount of attenuation (e.g., signal strength loss) of presence message 111, and device data storage 140 may estimate a distance between mobile device 110 and detector 120-A based on the attenuation. For example, device data storage 140 may determine a distance between mobile device 110 and detector 120-A using the Friis transmission formula in Equation 1:

$$L = 20 \log_{10}(4 0 \pi d / \lambda) \quad \text{(Eq. 1)}.$$

In Equation 1, L corresponds to the signal strength loss in decibels, d corresponds to the distance between mobile device 110 and detector 120-A, and λ corresponds to the wavelength of presence message 111.

In another implementation, device data storage 140 may further store other information associated with mobile device 110. For example, device data storage 140 may store information identifying a user of mobile device 110. Device data storage 140 may store other information associated with mobile device 110, such as commercial data identifying goods/services received by the user of mobile device 110, payment information, or other preference data.

As shown in FIG. 1A, device data storage 140 may selectively provide information regarding mobile device 110 to local device 150, such as information identifying an associated user. Device data storage 140 may notify local device 150 when presence message 111 is received from mobile device 110 (e.g., by detector 120-A) at a particular geographic location associated with local device 150. Device data storage 140 may notify local device 150 automatically (e.g., without receiving a request from local device 150) based on detecting mobile device 110 at an associated location or based on receiving a request from local device 150. Additionally or alternatively, device data storage 140 may notify local device 150 based on determining that mobile device 110 is moving toward a location associated with detector 120-A e.g., the distance between mobile device 110 and detector 120-A is decreasing).

Device data storage 140 may authenticate local device 150 to determine that local device 150 is authorized to access information regarding mobile device 110. For example, device data storage 140 may identify a particular detector 120-A associated with local device 150 (e.g., the particular detector 120-A is located at a particular geographic location associated with local device 150), and device data storage 140 may provide local device 150 with information regarding mobile device 110 when mobile device 110 is detected by the particular detector 120-A. For example, if local device 150 is associated with a commercial establishment, device data storage 140 may notify local device 150 when mobile device 110 is detected near the commercial establishment. In another example, device data storage 140 may notify local device 150 when mobile device 110 is approaching the commercial establishment (e.g., the distance between mobile device 110 and an associated detector 120-A is decreasing).

In another example, device data storage 140 selectively enables local device 150 to access different information regarding mobile device 110. For example, if local device 150 is associated with a commercial establishment, device data storage 140 may enable local device 150 to access information related to the commercial establishment. For example, if local device 150 is associated with a restaurant, device data storage 140 may enable local device 150 to access information related to an associated user's prior orders at the restaurant and/or the user's prior orders at other restaurants (e.g. other restaurants authorized to access device data storage 140).

In one implementation, device data storage 140 may receive data regarding mobile device 110 (or an associated user) from local device 150. For example, device data storage 140 may provide an interface, such as a graphical user interface (GUI), that enables local device 150 to submit information associated with the mobile device. For example, if local device 150 receives information from device data storage 140 indicating that mobile device 110 is detected at a particular location, local device 150 may add additional data to device data storage 140, such as an identifier for the user and/or information regarding the user's commercial activities, preferences, etc.

Local device 150 may include, for example, a personal communications system (PCS) terminal (e.g., that may combine a cellular radiotelephone with data processing and data communications capabilities), a wireless device, a smart phone, a tablet, a personal digital assistant (PDA) (e.g., that can include a radiotelephone, a pager, Internet/intranet access, etc.), a laptop computer (e.g., with a wireless air card), a global positioning system (GPS) device, a gaming device, a portable media player, a consumer electronics device, or other types of computation or communication devices.

Although FIGS. 1A and 1B show exemplary components of environment 100, in other implementations, environment 100 may include fewer components, different components, differently arranged components, or additional components than those depicted in FIGS. 1A and 1B. For example, device data storage 140 is shown in FIG. 1A as being remotely accessed by detector 120-A or local device 150 via network 130 (e.g., device data storage 140 may be a cloud-based service), but device data storage 140 may be physically positioned proximate to detector 120-A and/or local device 150. Additionally or alternatively, one or more components of environment 100 may perform functions described as being performed by one or more other components of environment 100.

Figure 2:
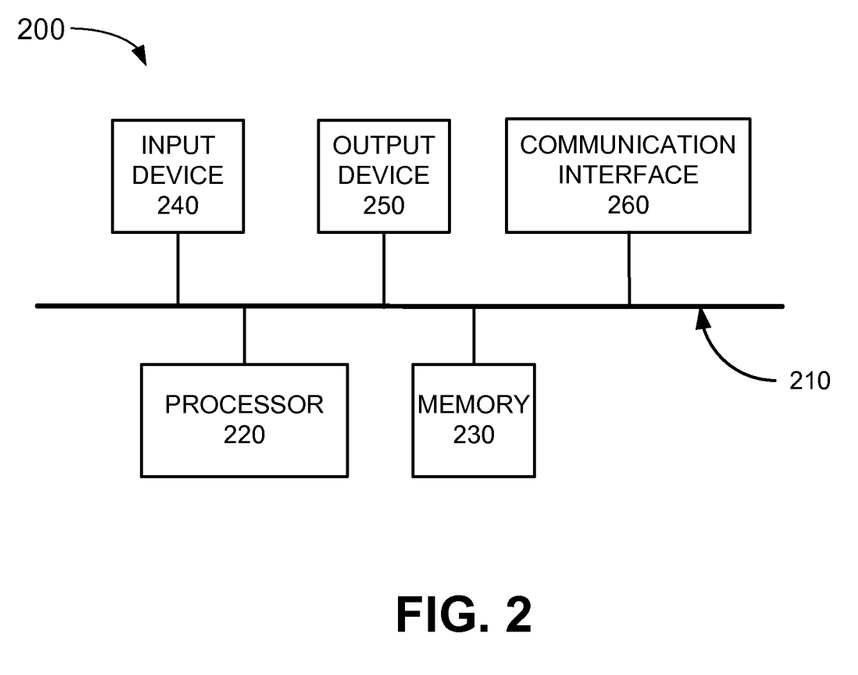
FIG. 2 is a diagram illustrating exemplary components of a device that may be included in the environment of FIGS. 1A and 1B.

FIG. 2 is a diagram illustrating exemplary functional components of device 200 according to an implementation described herein. Device data storage 140 and local device 150 may each include one or more devices 200. As shown in FIG. 2, device 200 may include a bus 210, a processor 220, a memory 230, an input unit 240, an output unit 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input unit 240 may allow an operator to input information into device 200. Input unit 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input unit 240. In other words, device 200 may be "headless" and may not include a keyboard, for example.

Output unit 250 may output information to an operator of device 200. Output unit 250 may include a display, a printer, a speaker, and/or another type of output device. For example, device 200 may include a display, which may include a liquid-crystal display (LCD) for displaying content to the customer. In some embodiments, device 200 may be managed remotely and may not include output unit 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth® wireless interface, a radio-frequency identification (RFID) interface, a near-field communications (NFC) wireless interface, and/or any other type of interface that converts data from one form to another form.

As will be described in detail below, device 200 may perform certain operations relating to modification of search and advertisement selection for a second screen device, associated with a video asset being streamed to a first screen device. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than those depicted in FIG. 2. Additionally or alternatively, one or more components of device 200 may perform one or more tasks described as being performed by one or more other components of device 200.

Figure 3:
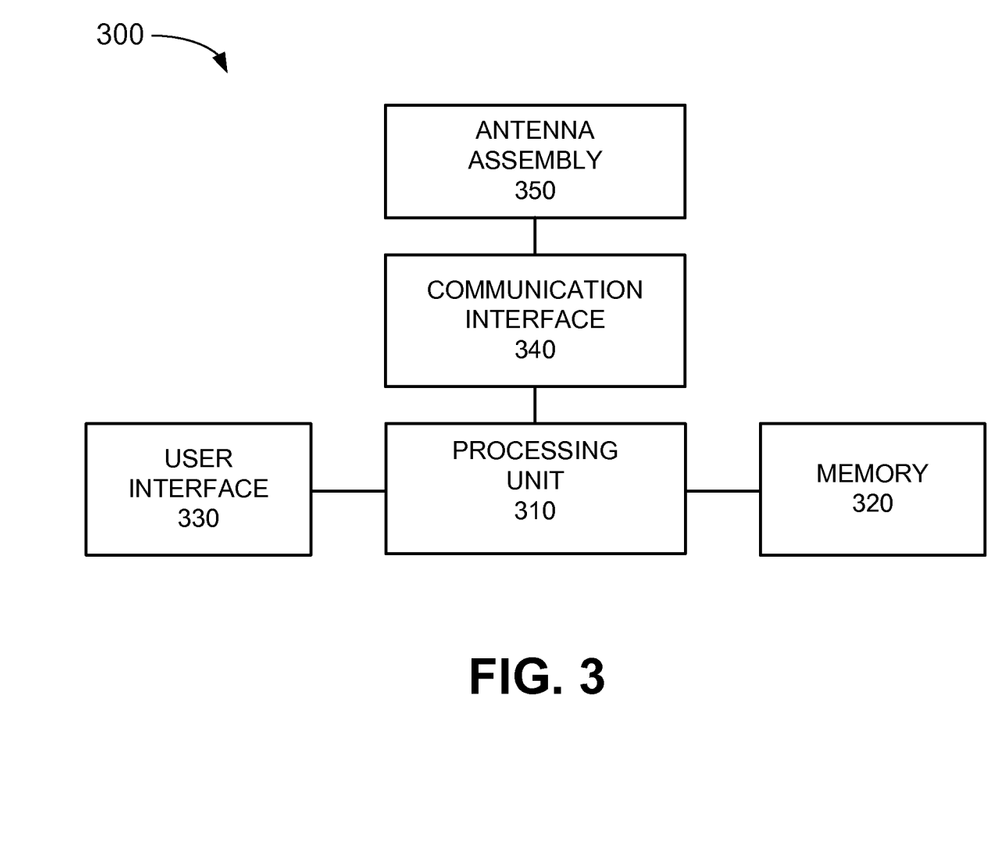
FIG. 3 is a diagram illustrating exemplary components of a wireless device that may be included in the environment of FIGS. 1A and 1B.

FIG. 3 is a diagram illustrating exemplary components of a wireless device 300 according to an implementation described herein. Mobile device 110 and detector 120 may each include one or more wireless devices 300. As shown in FIG. 3, wireless device 300 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), and/or other processing logic. Processing unit 310 may control operation of mobile device 110 (or detector 120) and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may allow a user to input information to wireless device 300 and/or to output information from wireless device 300. Examples of user interface 330 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as an LCD, to output visual information; an actuator to cause wireless device 300 to vibrate; a sensor; and/or any other type of input or output device.

Communication interface 340 may include a transceiver that enables wireless device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth® wireless interface, a radio-frequency identification (RFID) interface, a near-field communications (NFC) wireless interface, and/or any other type of interface that converts data from one form to another form.

Antenna assembly 350 may include one or more antennas to transmit and/or receive RF signals. Antenna assembly 350 may, for example, receive RF signals from communication interface 340 and transmit the signals via an antenna and receive RF signals from an antenna and provide them to communication interface 340. For the configuration wherein wireless device 300 is included within detector 120, antenna assembly 350 may be designed to include the directional antenna of FIG. 1B, or the non-directional antenna of FIG. 1A.

As described herein, wireless device 300 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of wireless device 300, in other implementations, wireless device 300 may include fewer components, different components, differently arranged components, or additional components than those depicted in FIG. 3. Additionally or alternatively, one or more components of wireless device 300 may perform the tasks described as being performed by one or more other components of wireless device 300.

Figure 4:
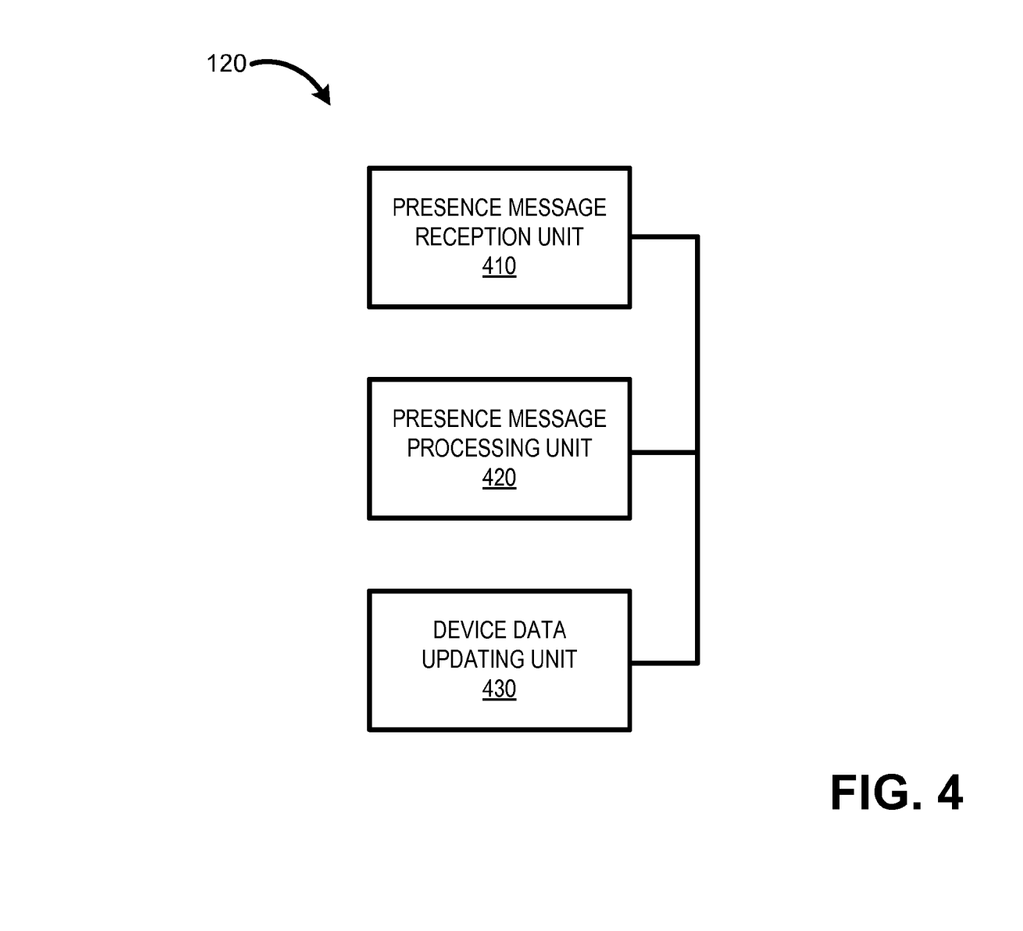
FIG. 4 is a diagram illustrating exemplary functional components of a detector that may be included in the environment of FIGS. 1A and 1B.

FIG. 4 is a diagram illustrating exemplary functional components of detector 120 according to an implementation described herein. The functional components of detector 120 may be implemented, for example, via processing unit 310 executing instructions from memory 320. Alternatively, some or all of the functional components of detector 120 may be implemented via hard-wired circuitry. As shown in FIG. 4, detector 120 may include a presence message reception unit 410, a presence message processing unit 420, and a device data updating unit 430.

Presence message reception unit 410 may receive presence message 111 when mobile device 110 is located within a detection area 121 (shown in FIG. 1A as detection area 121-A and in FIG. 1B as detection area 2). Detection area 121 may correspond to a geographic region in which detector 120 is able to detect presence message 111 transmitted from mobile device 110.

Presence message processing unit 420 may parse presence message 111 (e.g., as received by presence message reception unit 410) to extract data identifying mobile device 110. For example, detector 120 may parse presence message 111 to determine the MAC address or other device identifier, a device type, etc. associated with mobile device 110. Additionally or alternatively, presence message processing unit 420 may determine physical characteristics associated with presence message 111. For example, presence message processing unit 420 may identify a frequency, a received signal strength, etc. of a received presence message 111. For example, presence message processing unit 420 may determine a RSSI value or a RCPI value associated with the received presence message 111.

Device data updating unit 430 may form a notification message 122 and may forward notification message 122 to device data storage 140 via network 130. Notification message 122 may include data identifying a location and/or other information associated with detector 120. Notification message 122 may also include information extracted from presence message 111. Device data updating unit 430 may further include, in notification message 122, data regarding detected attributes of a received version of presence message 111, such as a received signal strength, frequency, etc.

Although FIG. 4 shows exemplary functional components of detector 120, in other implementations, detector 120 may include fewer functional components, different functional components, differently arranged functional components, or additional functional components than those depicted in FIG. 4. Additionally or alternatively, one or more functional components of detector 120 may perform functions described as being performed by one or more other functional components of detector 120.

Figure 5:
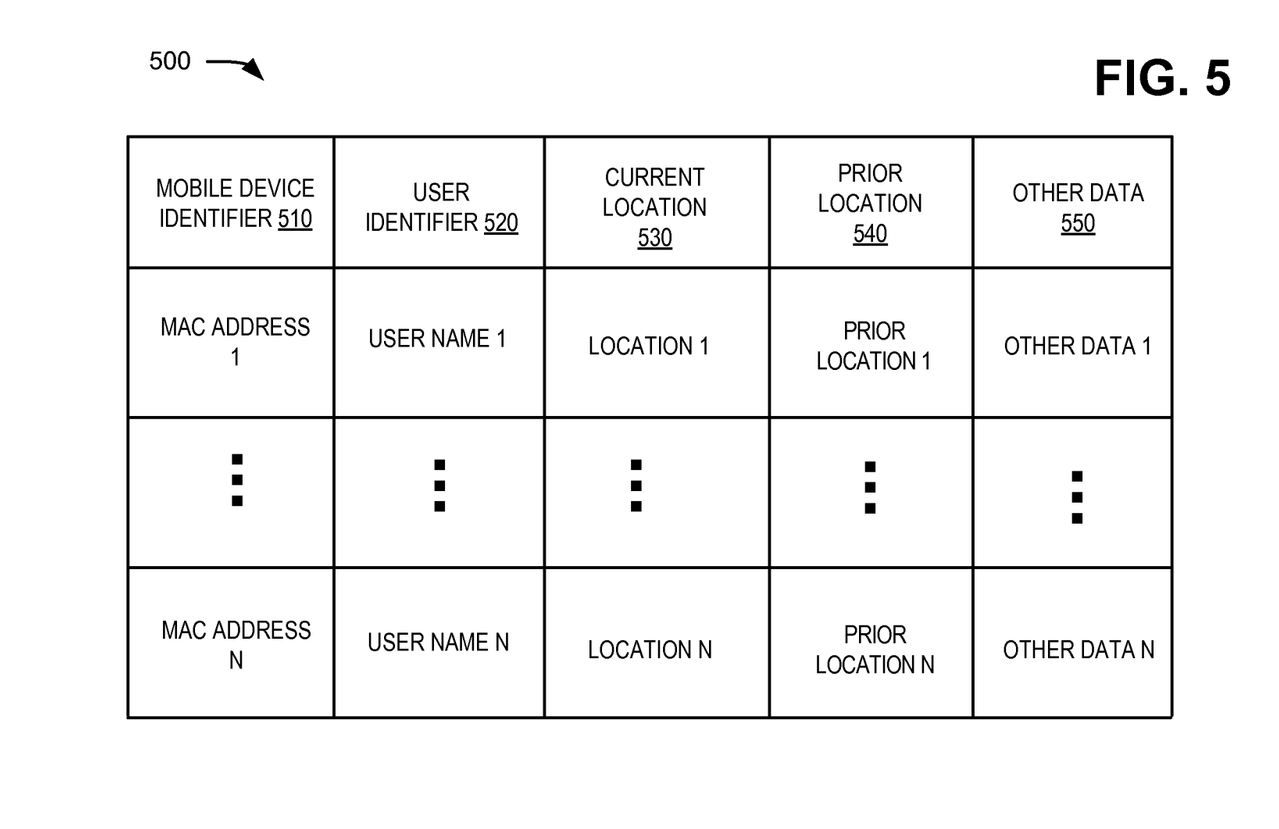
FIG. 5 shows an exemplary table storing data that may be collected and stored within the environment of FIGS. 1A and 1B.

FIG. 5 shows an exemplary table 500 that includes data that may be stored by device data storage 140 in one implementation. As shown in FIG. 5, table 500 may include, for example, a mobile device identifier column 510, a user identifier column 520, a current location column 530, a prior location column 540, and/or an other data column 550. In table 500, data included in entries in a row may be associated with a same mobile device (e.g., user name 1, current location 1, prior location 1, and other data 1 may be associated with MAC address 1).

Mobile device identifier column 510 may store information identifying mobile device 110, such as the MAC address, and user identifier column 520 may store information identifying a user associated with mobile device 110. In one implementation, device data storage 140 may receive notification message 122 indicating the mobile device 110 is detected at a location associated with detector 120. Device data storage 140 may use a device identifier (e.g., a MAC address) to access table 500 and identify an associated user (based on data stored in user identifier column 520) and may forward data identifying the user to local device 150 to indicate that the user is present at a location associated with detector 120.

In one implementation, device data storage 140 may access other data associated with mobile device 110 (e.g., billing records stored at a billing server or other device) and may use the data to populate user identifier column 520.

In another implementation, device data storage 140 may identify multiple mobile devices 110 associated with a same user. For example, different MAC addresses identified in entries in mobile device identifier column 510 may be associated with a similar user name identified in entries in user identifier column 520.

As shown in FIG. 5, table 500 may further include current location column 530 and/or prior location column 540. For example, current location column 530 may store data identifying a geographic location associated with detector 120 currently sensing mobile device 110, and prior location column 540 may store data identifying one or more geographic locations associated with other detectors 120 that previously sensed mobile device 110. Additionally or alternatively, current location column 530 and/or prior location column 540 may store data identifying a geographic location associated with mobile device 110 (e.g., a distance of mobile device 110 from the geographic location associated with a detector 120). As described above, notification message 122 may include information associated with one or more attributes of presence message 111, and device data storage 140 may use this information to determine the geographic location associated with mobile device 110.

Continuing with FIG. 5, table 500 may include other data column 550. Other data column 550 may store, for example, commercial preferences associated with mobile device 110. For example, if local device 150 is associated with a coffee shop or restaurant, other data column 550 may store data identifying a user's preferred order. In another example, if local device 150 is associated with a hotel room, other data column 550 may identify the user's preferred room type and/or environmental conditions, such as a desired room temperature, music stations, etc. Other data column 550 may further identify a room associated with mobile device 110, and this information may enable mobile device 110 to enter the room. For example, local device 150 may program a locking mechanism to open when mobile device 110 approaches the locking mechanism (e.g., when a detector 120 near the locking mechanism detects presence message 111 from the mobile device 110).

For example, upon user device 120 arriving at the hotel, an airport gate, restaurant, rental car lot, etc., an associated detector 120 may receive presence message 111 and may identify a MAC address associated with user device 120. Device data store 140 may perform a lookup comparing the determined MAC address to other known MAC addresses to identify an associated user and obtain account or other information associated with that user. Local device 150 may then obtain and provide the user information for display and/or automatically causes implementation of preferences associated with the user.

In a hotel scenario, local device 150 may implement the stored preference data to set things like climate control, radio station, TV channel guide and pay TV services, lighting, internet access, etc. within a particular hotel room assigned to the user.

In the airport gate/terminal scenario, local device 150 may automatically check in a traveler associated with mobile device 110, inform him of the gate he needs to go to, direct him to a particular security area, pre-order refreshments at an airline club, etc.

In the restaurant scenario, local device 150 may send a message to mobile device 110 to enable the user could reserve a table remotely (e.g., when presence message 111 is received by a first detector 120 located away from the restaurant), and upon further detection of mobile device's 110 MAC address (e.g., when presence message 111 is received by a second detector 120 proximate to the restaurant), device data storage 140 would inform a local device associated with a hostess at the restaurant that the user has arrived, and if the user has already pre-ordered menu items, device data storage 140 may automatically inform mobile device that a table is ready, and would guide the user to the particular reserved table (e.g. by identifying path between a first location of mobile device 110 and a second location of the table). In addition, upon informing that the table is ready, device data storage 140 may forward instructions to another local device 150 associated with kitchen personnel to begin preparing the pre-ordered food items.

In the hotel room scenario or a rental car lot scenario, in addition to checking in the user, device data storage 140 could automatically provide and/or program mobile device 110 with authentication credentials to gain access to the hotel room door lock, or to a vehicle's door, trunk, and vehicle start. Both scenarios may include, for example, programming the mobile device 110 with a public key that matches a private key of the asset (e.g., the hotel room or vehicle). Additionally or alternatively, a hashing routine could be used to automatically program the hotel access door or rental vehicle. Additionally, device data storage 140 may forward to a local device 150 and in connection with sending the access information, preference data could be included in a message to mobile device 110 and indicate a portion of the preference data to use when performing a hash algorithm.

Furthermore, other data column 550 may store timing data associated with various preference data. For example, if local device 150 is associated with a hotel room, other data column 550 may store data identifying a time period when the locking mechanism will open when mobile device 110 is detected (e.g., the time the user has rented the hotel room). In another example, other data column 550 may store data identifying a first time period associated with first preference data (e.g., a preferred lunch order) and a second different time period associated with second preference data (e.g., a preferred dinner order).

Figure 6:
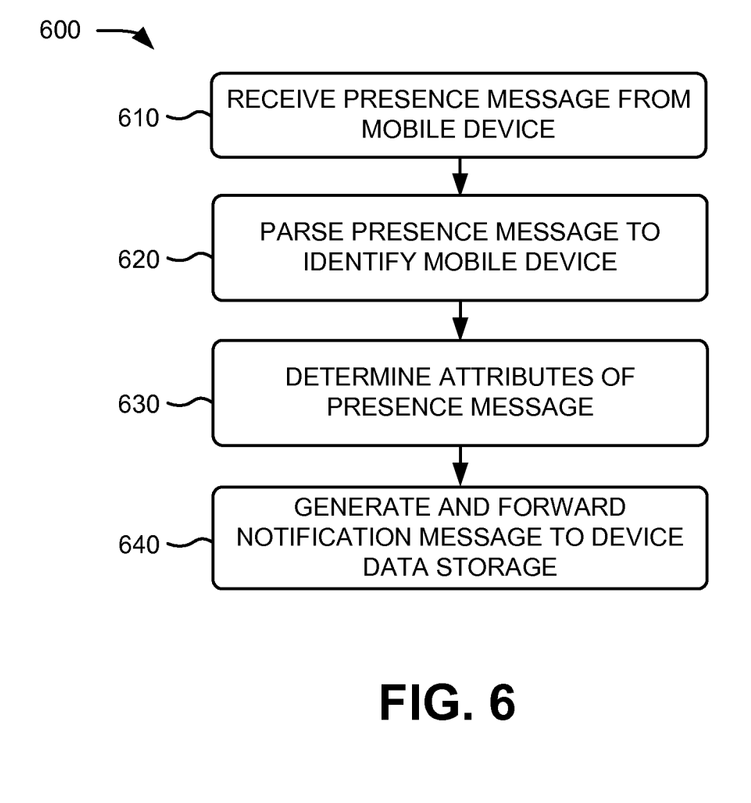
FIG. 6 is a flowchart of a process for collecting data regarding a mobile device included in the environment of FIGS. 1A and 1B.

FIG. 6 is a flowchart of a process 600 of generating notification message according to an implementation described herein. In some implementations, process 600 may be performed by detector 120 (e.g., by the functional components shown in FIG. 4). In other implementations, some or all of process 600 may be performed by another device or a group of devices separate from and/or including detector 120.

Process 600 may include receiving presence message 111 (block 610). For example, presence message reception unit 410 may receive presence message 111 when mobile device 110 is located within a detection area 121 that corresponds to a geographic region in which detector 120 is able to detect presence message 111 transmitted from mobile device 110.

As shown in FIG. 6, process 600 may include parsing presence message 111 to obtain information regarding mobile device 110 (block 620). For example, presence message processing unit 420 may parse presence message 111 (e.g., as received by presence message reception unit 410) to extract data identifying mobile device 110. For example, detector 120 may parse presence message 111 to determine the MAC address or other device identifier, a device type, manufacturer, model, etc. associated with mobile device 110.

As shown in FIG. 6, process 600 may further include determining attributes of presence message 111 (block 630). For example, presence message processing unit 420 may determine physical characteristics associated with presence message 111. For example, presence message processing unit 420 may identify a frequency, a received signal strength of a received presence message 111, etc. For example, presence message processing unit 420 may determine a RSSI value or a RCPI value associated with the received presence message 111.

Continuing with FIG. 6, process 600 may further generate notification message 122 and forward notification message 122 to device data storage 140 (block 640). For example, device data updating unit 430 may forward notification message 122 to device data storage 140 via network 130. Notification message 122 may include data identifying a location and/or other information associated with detector 120. Notification message 122 may also include information extracted from presence message 111. Device data updating unit 430 may further include, in notification message 122, data regarding detected attributes of a received version of presence message 111, such as a received signal strength, frequency, etc.

Figure 7:
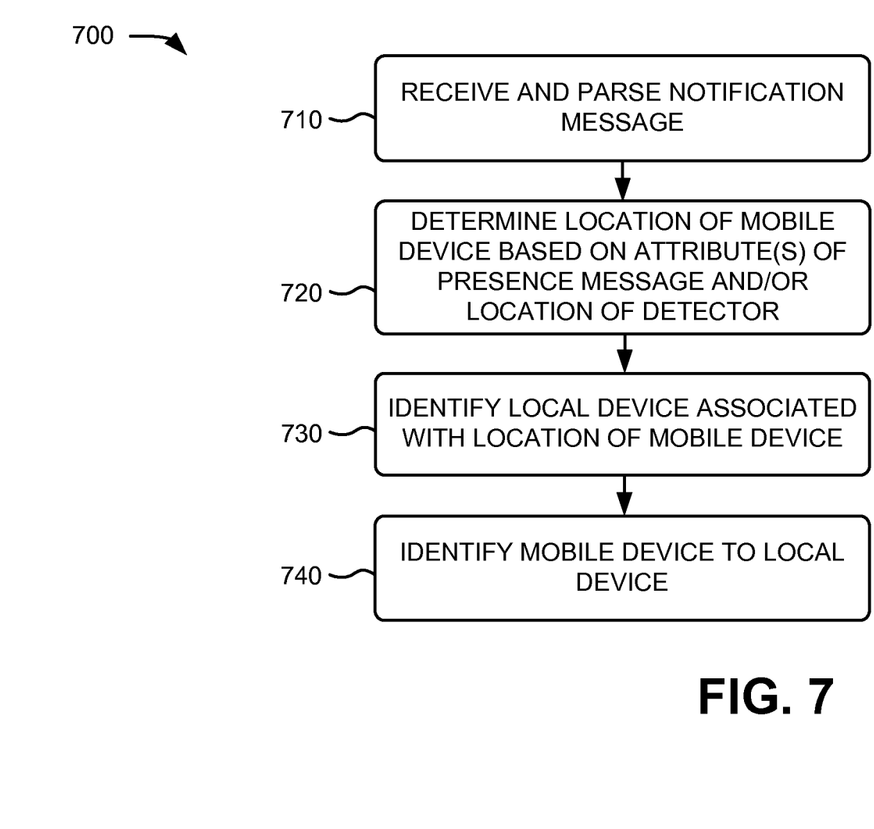
FIG. 7 is a flowchart of a process for distributing data regarding the mobile device to a local device included in the environment of FIGS. 1A and 1B.

FIG. 7 is a flowchart of a process 700 for providing data regarding mobile device 110 to local device 150. In some implementations, process 700 may be performed by device data storage 140. In other implementations, some or all of process 700 may be performed by another device or a group of devices (e.g., other devices that are not shown in FIG. 1A) separate from and/or including device data storage 140.

As shown in FIG. 7, process 700 may include receiving and parsing notification message 122 (block 710). For example, device data storage 140 may process notification message 122 to extract and store information regarding mobile device 110 and/or detector 120. For example, device data storage 140 may store information associating a mobile device 110 (and its user) with a location of detector 120.

As shown in FIG. 7, process 700 may also include determining a location of mobile device 110 based on a location of detector 120 and/or attributes of presence message 111 (block 720). For example, device data storage 140 may determine a device type (e.g., based on a CoD value included in presence message 111), a manufacturer, model, operational mode, or other feature associated with mobile device 110, and device data storage 140 may use this information to determine an original signal power that mobile device 110 used to transmit presence message 111. In block 720, device data storage 140 may further compare the original signal power and a signal power of presence message 111, as received by detector 120, to determine an amount of attenuation (e.g., signal strength loss) of presence message 111, and device data storage 140 may estimate a distance between mobile device 110 and detector 120 based on the attenuation.

As shown in FIG. 7, process 700 may further include identifying a particular local device 150 associated with the location of the mobile device 110 (block 730) and identifying mobile device 110 to the particular local device 150 (block 740). For example, device data storage 140 may store data associating a geographic location associated with detector 120. In block 740, device data storage 140 may notify local device 150 when mobile device 110 is detected (e.g., by detector 120) at a particular geographic location associated with local device 150. Additionally or alternatively, device data storage 140 may notify local device 150 based on determining that mobile device 110 is moving toward a location associated with detector 120 (e.g., the distance between mobile device 110 and detector 120 is decreasing). In another example, device data storage 140 may identify a particular detector 120 associated with local device 150 (e.g., the particular detector 120 is located at a particular geographic location associated with local device 150), and device data storage 140 may provide access to local device 150 when mobile device 110 is detected by the particular detector 120. For example, if local device 150 is associated with a commercial establishment, device data storage 140 may notify local device 150 when mobile device 110 is detected near or within the commercial establishment.

In one implementation, device data storage 140 may authenticate local device 150 to determine that local device 150 is authorized to access information regarding mobile device 110. For example, device data storage 140 may determine whether local device 150 is associated with a subscriber who has paid to access device data storage 140.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6-7, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code-it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:
1. A method comprising:
receiving, by a processor associated with a detector, a message sent from a mobile device, wherein the mobile device sends the message without receiving a request from the detector, and wherein the detector is positioned at a first geographic location;

parsing, by the processor, the message to obtain data associated with the mobile device;

obtaining, by the processor and based on the data associated with the mobile device, data identifying a user associated with the mobile device;

determining, by the processor, a local device associated with the first geographic location;

forwarding, by the processor, the data identifying the user to the local device;

identifying, by the processor, an attribute value associated with the message, wherein the attribute value includes a received signal strength of the message;

determining, by the processor and based on the attribute value, a second geographic location associated with the mobile device, wherein determining the second geographic location includes:

identifying, based on the data associated with the mobile device, a device class associated with the mobile device,     determining, based on the device class, a transmission signal strength associated with the message,     determining a distance between the mobile device and the detector based on a change between the transmission signal strength and the received signal strength, and     determining the second geographic location based on the distance and the first geographic location; and forwarding, by the processor, data identifying the second geographic location to the local device.

2. The method of claim 1, wherein the message includes a Bluetooth connection request.

3. The method of claim 1, wherein the data associated with the mobile device includes a media access control (MAC) address of the mobile device.

4. The method of claim 1, wherein the first geographic location is associated with a commercial establishment, and wherein the method further includes:

identifying preference data associated with the user regarding the commercial establishment; and     forwarding the preference data to the local device.

5. The method of claim 1, wherein the detector includes an antenna that detects the message in a particular direction, and wherein identifying the attribute value associated with the message includes:

measuring, using the antenna, the attribute value with respect to the particular direction.

6. The method of claim 1, wherein the data associated with the mobile device includes data identifying one or more of:

a mobile station identifier (MSID) of the mobile device,     a mobile identification number (MIN) of the mobile device,     a telephone number of the mobile device, a network address of the mobile device,     a media access control (MAC) address of the mobile device,     class of device (CoD) of the mobile device,     a device type of the mobile device,     a service offered by the mobile device,     a feature of the mobile device,     a manufacturer of the mobile device,     a communication protocol accepted by the mobile device, or     a clock offset used by the mobile device.

7. The method of claim 1, further comprising:

forwarding data identifying the attribute value to the local device.

8. A device comprising:

an antenna configured to detect a message sent from a mobile device, wherein the mobile device sends the message without receiving a request from the device, and wherein the device is positioned at a first geographic location; and a processor configured to:

parse the message to obtain data associated with the mobile device;

determine, based on the data associated with the mobile device, data identifying a user associated with the mobile device;

identify a local device associated with the first geographic location;

forward the data identifying the user to the local device;

identify an attribute value associated with the message, wherein the attribute value includes a received signal strength of the message;

determine, based on the attribute value, a second geographic location associated with the mobile device, wherein the processor, when determining the second geographic location, is further configured to:

identify, based on the data associated with the mobile device, a device class associated with the mobile device,         determine, based on the device class, a transmission signal strength associated with the message,         determine a distance between the mobile device and the device based on a change between the transmission signal strength and the received signal strength, and         determine the second geographic location based on the distance and the first geographic location; and     forward data identifying the second geographic location to the local device.

9. The device of claim 8, wherein the message includes a Bluetooth connection request.

10. The device of claim 8, wherein the data associated with the mobile device includes a media access control (MAC) address of the mobile device.

11. The device of claim 8, wherein the first geographic location is associated with a commercial establishment, and wherein the processor is further configured to:

identify preference data associated with the user regarding the commercial establishment; and     forward the preference data to the local device.

12. The device of claim 8, wherein the antenna detects the message in a particular direction, and wherein the processor, when determining the distance, is further configured to:

measure, using the antenna, the distance with respect to the particular direction.

13. The device of claim 8, wherein the processor, when determining the transmission signal strength associated with the message, is further configured to:

identify a message type associated with the message, and     determine the transmission signal strength based on the message type.

14. The device of claim 8, wherein the attribute value further identifies a transmission frequency associated with the message, and wherein the processor determines the distance between the mobile device and the device further based on the transmission frequency.

15. A non-transitory computer-readable medium configured to store instructions, the instructions comprising:

one or more instructions that, when executed by a processor associated with a detector, cause the processor to:

detect a message sent from a mobile device, wherein the mobile device sends the message without receiving a request from the detector, and wherein the detector is positioned at a first geographic location;
parse the message to obtain data associated with the mobile device;
determine, based on the data associated with the mobile device, data identifying a user associated with the mobile device;
identify a local device associated with the first geographic location;
forward the data identifying the user to the local device;
identify an attribute value associated with the message, wherein the attribute value includes a received signal strength of the message;
determine, based on the attribute value, a second geographic location associated with the mobile device, wherein the one or more instructions further cause the processor, when determining the second geographic location, to:
  identify, based on the data associated with the mobile device, a device class associated with the mobile device,
  determine, based on the device class, a transmission signal strength associated with the message,
  determine a distance between the mobile device and the device based on a change between the transmission signal strength and the received signal strength, and
  determine the second geographic location based on the distance and the first geographic location; and
forward data identifying the second geographic location to the local device.

16. The non-transitory computer-readable medium of claim 15, wherein the data associated with the mobile device includes a media access control (MAC) address of the mobile device.

17. The non-transitory computer-readable medium of claim 15, wherein the first geographic location is associated with a commercial establishment, and wherein instructions further include:
one or more instructions that, when executed by the processor, cause the processor to:
  identify preference data associated with the user regarding the commercial establishment; and
  forward the preference data to the local device.

18. The non-transitory computer-readable medium of claim 15, wherein the detector includes an antenna that detects the message in a particular direction, and wherein the one or more instructions, when causing the processor to determine the distance, further cause the processor to:
measure, using the antenna, the distance with respect to the particular direction.

19. The non-transitory computer-readable medium of claim 15, wherein a first local device and a second local device are associated with the first geographic location, and wherein the one or more instructions further cause the processor, when identifying the local device associated with the first geographic location, to:
determine whether the message is received from the mobile device from a first direction or from a second direction;
select the first local device as the local device when the message is received from the first direction; and
select the second local device as the local device when the message is received from the second direction.

20. The non-transitory computer-readable medium of claim 15, wherein the one or more instructions further cause the processor to:
determine a direction from which the message is received from the mobile device; and
forward data identifying the direction to the local device.

* * * * *